Figure 1:
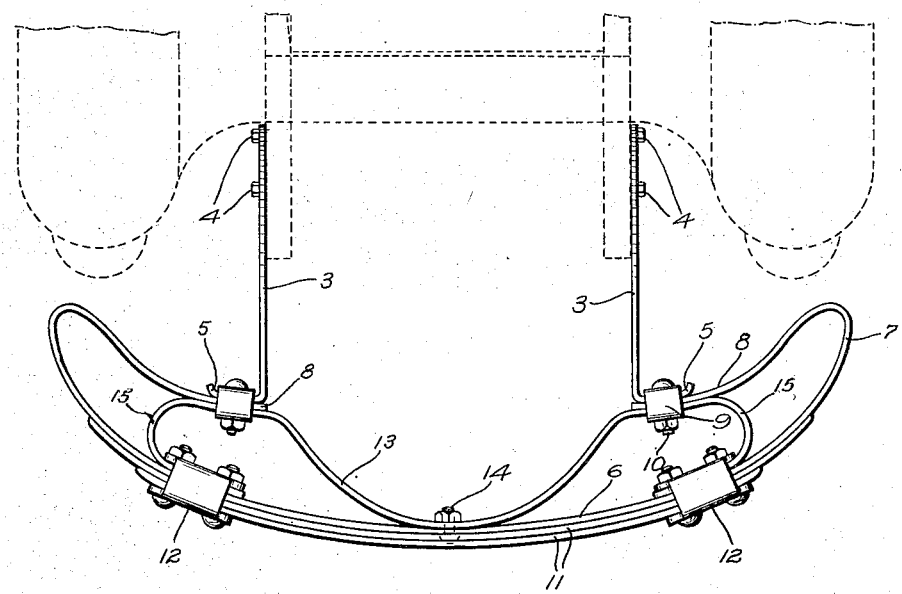

April 14, 1925.

I. FEINER 1,534,010

AUTOMOBILE BUMPER

Filed June 7, 1924

WITNESSES

INVENTOR
I. FEINER
BY
ATTORNEYS

Patented Apr. 14, 1925.

1,534,010

UNITED STATES PATENT OFFICE.

ISRAEL FEINER, OF BROOKLYN, NEW YORK.

AUTOMOBILE BUMPER.

Application filed June 7, 1924. Serial No. 718,620.

*To all whom it may concern:*

Be it known that I, ISRAEL FEINER, a citizen of the United States, and a resident of the city of New York, borough of Brooklyn, in the county of Kings and State of New York, have invented a new and Improved Automobile Bumper, of which the following is a full, clear, and exact description.

This invention relates to improvements in bumpers, particularly adapted for use on motor vehicles, and has for one of its objects to provide an improved bumper of simple and inexpensive construction and in which the parts are so formed and assembled that the bumper will have maximum strength and durability to withstand shocks and blows to which it might be subjected.

The above and other objects will appear more clearly from the following detailed description, when taken in connection with the accompanying drawing, which illustrates a preferred embodiment of the inventive idea.

In the drawing—

Figure 2:
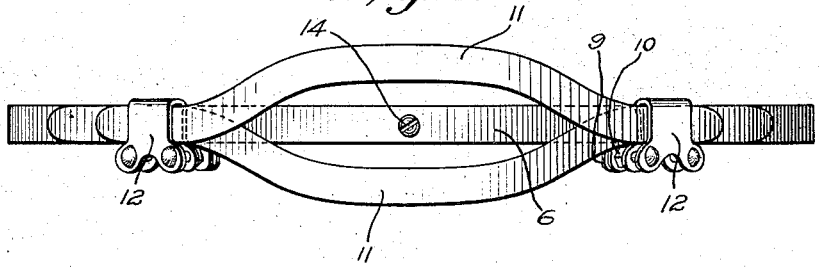

Figure 1 is a plan view of the bumper constructed in accordance with the invention and showing the manner of its attachment to a motor vehicle; and Figure 2 is a front elevation thereof.

The form of the invention illustrated in the drawing shows the same as comprising a pair of oppositely disposed supporting arms 3, the inner ends of which are capable of attachment to a suitable part of a motor vehicle by means of bolts 4 and the outer ends of which are bent laterally to form the extensions 5 to which the body of the bumper is secured.

The body of the bumper includes the base or intermediate strip 6 formed of flexible metal, the end portions 7 of which are bent upon themselves and the extremities 8 secured to the extensions 5 by means of U-shaped clips 9 fastened in position by means of bolts 10. The body of the bumper further includes the auxiliary strips 11 the intermediate portions of which are arranged above and below the strip 6 and combine to form the main portion of the bumper. The strips 11 are made of the same material as the strip 6 and the ends thereof are overlapped and extend coincident with the adjacent portions of the strip 6, as clearly shown in Figure 2. U-shaped clips 12 are utilized to secure the ends of the strips 11 to the strip 6 to securely maintain the strips in proper position. The bumper further includes a brace 13 formed from a strip of material such as the strips 6 and 11 and the intermediate portion of the brace 13 is bowed and secured by a bolt 14 to the intermediate portion of the strip 6. The portions of the brace 13 contiguous to the bow therein are extended through the clips 9 with the extremities 8 of the strip 6 interposed between said portions and the extensions 5 of the supports 3. The ends 15 of said brace are then curved and extended in the direction of the intermediate or bowed portion of the brace and then secured in the clips 12, thereby providing two points of attachment with the body of the bumper and affording additional bracing strength.

It will thus be seen from the foregoing description that by forming the body of the bumper with the base strip 6 having its ends bent upon itself and secured to the supports 3 with the intermediate portion of the strip braced by the brace 13, which is also secured to said supports and said body, a structure is provided which will embody a maximum strength and durability and be capable of resisting severe shocks.

What is claimed is:

1. A bumper including supports capable of being secured to a vehicle, a body including a base strip having its ends bent with respect to the main portion of the strip, a brace having an intermediate portion and its ends secured to said body, and portions contiguous to said intermediate portion disposed adjacent the ends of said strip, and devices on the ends of the supports, each device comprising a single clamp for securing the support, one end of the strip and said brace together.

2. A bumper including supports capable of being secured to a vehicle, a body including a base strip having its ends bent with respect to the main portion of the strip, a brace having an intermediate portion secured to said base strip and other portions disposed adjacent the ends of said strip, means for securing said supports and ends of said strip and said brace together, and other strips having their intermediate portions arranged on opposite sides respectively of said base strip and their ends overlapped and extending coincident with the adjacent portions of said base strip.

3. A bumper including supports capable of attachment to a vehicle and having extensions at their outer ends, a base strip bent upon itself at its ends and having its extremities engaged with the extensions of said supports, other strips secured to intermediate portions of said base strip, a brace bowed intermediate its ends and secured to said base strip intermediate the ends thereof, other portions of said brace being engaged with the ends of said base strip, and clips for securing said extensions and the ends of said base strip and brace together.

ISRAEL FEINER.